(12) United States Patent
Ishida

(10) Patent No.: US 12,326,677 B2
(45) Date of Patent: Jun. 10, 2025

(54) DRIVE TRANSMISSION MECHANISM, AND FIXING DEVICE AND IMAGE FORMING APPARATUS INCLUDING THE SAME

(71) Applicant: KYOCERA Document Solutions Inc., Osaka (JP)

(72) Inventor: Hirotaka Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/750,708

(22) Filed: Jun. 21, 2024

(65) Prior Publication Data
US 2025/0003470 A1  Jan. 2, 2025

(30) Foreign Application Priority Data
Jun. 28, 2023 (JP) .................. 2023-105986

(51) Int. Cl.
*G03G 15/20* (2006.01)
*F16D 7/00* (2006.01)
*F16D 7/04* (2006.01)
*F16H 55/00* (2006.01)
*F16H 55/17* (2006.01)

(52) U.S. Cl.
CPC ......... *G03G 15/2017* (2013.01); *F16D 7/044* (2013.01); *F16H 55/17* (2013.01); *G03G 15/2064* (2013.01); *Y10T 74/19172* (2015.01)

(58) Field of Classification Search
CPC ........... G03G 15/2017; G03G 15/2064; G03G 15/5008; G03G 15/757; F16H 55/17; Y10T 74/19079; Y10T 74/19172; F16D 7/04; F16D 7/044; F16D 7/042

USPC .................................... 399/122, 328
See application file for complete search history.

(56) References Cited

U.S. PATENT DOCUMENTS

| | | | | |
|---|---|---|---|---|
| 9,063,461 | B2* | 6/2015 | Kubo | G03G 15/5008 |
| 2015/0185664 | A1 | 7/2015 | Ishido | |
| 2015/0212456 | A1* | 7/2015 | Imaizumi | G03G 21/1647 |
| | | | | 74/665 G |
| 2018/0087604 | A1* | 3/2018 | Tamura | G03G 15/1615 |
| 2019/0227477 | A1* | 7/2019 | Hanamoto | G03G 21/16 |
| 2022/0297965 | A1* | 9/2022 | Takeuchi | B65H 85/00 |

(Continued)

FOREIGN PATENT DOCUMENTS

| | | |
|---|---|---|
| JP | S 59-34575 A | 2/1984 |
| JP | 2015-125209 A | 7/2015 |

*Primary Examiner* — Robert B Beatty
(74) *Attorney, Agent, or Firm* — Stein IP, LLC

(57) ABSTRACT

A drive transmission mechanism includes a first ratchet mechanism, a second ratchet mechanism, and a link member. The first ratchet mechanism includes a first drive input gear, a first drive output gear, and a first coupling member. The second ratchet mechanism includes a second drive input gear, a second drive output gear, and a second coupling member. The link member, due to a thrust movement of the first coupling member in a direction separating from the first drive output gear, causes the second coupling member to move in a direction approaching the second drive output gear, and the link member, due to a thrust movement of the second coupling member in a direction separating from the second drive output gear, causes the first coupling member to move in a direction approaching the first drive output gear.

8 Claims, 8 Drawing Sheets

(56) References Cited

U.S. PATENT DOCUMENTS

2023/0152738 A1* 5/2023 Okamoto ........... G03G 21/1647
                                                    399/330
2023/0166927 A1* 6/2023 Nakamura ......... G03G 15/6529
                                                    271/109

* cited by examiner

DRIVE TRANSMISSION MECHANISM, AND FIXING DEVICE AND IMAGE FORMING APPARATUS INCLUDING THE SAME

INCORPORATION BY REFERENCE

This application is based on and claims the benefit of priority from Japanese Patent Application No. 2023-105986 filed on Jun. 28, 2023, the contents of which are hereby incorporated by reference.

BACKGROUND

The present disclosure relates to a drive transmission mechanism that transmits a driving force to a driven member, and a fixing device and an image forming apparatus that include the same.

Conventionally, in drive devices of image forming apparatuses such as copiers, printers, etc., methods have often been used in which drive is transmitted to different units by forward and reverse rotations of a motor, thereby reducing switch mechanisms such as a clutch and the like. Representative examples of drive-transmission-target switching means used in such conventional drive devices include a ratchet mechanism in which helical slopes are formed in both a driving gear and a driven gear for their thrust movements, and a planetary gear mechanism in which the position of a gear itself is shifted by a tooth surface force in power transmission.

SUMMARY

According to one aspect of the present disclosure, a drive transmission mechanism includes a first ratchet mechanism and a second ratchet mechanism. The first ratchet mechanism transmits a rotational driving force from a drive source to a first driven member. The second ratchet mechanism transmits a rotational driving force from the drive source to a second driven member. The first ratchet mechanism includes a first drive input gear, a first drive output gear, and a first coupling member. To the first drive input gear, a rotational driving force of the drive source is inputted. The first drive output gear is disposed on a same axis as the first drive input gear, and outputs a rotational driving force of the drive source to the first driven member. The first coupling member is disposed between the first drive input gear and the first drive output gear so as to be capable of performing a thrust movement, and rotates along with the first drive input gear. The second ratchet mechanism includes a second drive input gear, a second drive output gear, and a second coupling member. To the second drive input gear, a rotational driving force of the drive source is inputted. The second drive output gear is disposed on a same axis as the second drive input gear, and outputs a rotational driving force of the drive source to the second driven member. The second coupling member is disposed between the second drive input gear and the second drive output gear so as to be capable of performing a thrust movement, and rotates along with the second drive input gear. Each of the first coupling member and the second coupling member has a first ratchet tooth formed in a surface thereof facing the first output gear or the second drive output gear. Each of the first drive output gear and the second drive output gear has a second ratchet tooth that is formed in a surface thereof facing the first coupling member or the second coupling member, and that meshes with the first ratchet tooth.

When the drive source rotates in a forward direction, the first ratchet mechanism rotates in a direction in which drive coupling surfaces of the first ratchet tooth and the second ratchet tooth mesh with each other, and thereby the first ratchet mechanism enters a drive coupling state for transmitting a driving force to the first driven member, and the second ratchet mechanism rotates in a direction in which non-drive coupling surfaces of the first ratchet tooth and the second ratchet tooth mesh with each other, and thereby the second ratchet mechanism enters a non-drive coupling state for transmitting no driving force to the second driven member. when the drive source rotates in a reverse direction, the first ratchet mechanism rotates in a direction in which the non-drive coupling surfaces mesh with each other, and thereby the first ratchet mechanism enters a non-drive coupling state for transmitting no driving force to the first driven member, and the second ratchet mechanism rotates in a direction in which the drive coupling surfaces mesh with each other, and thereby the second ratchet mechanism enters a drive coupling state for transmitting a driving force to the second driven member. Between the first ratchet mechanism and the second ratchet mechanism, a link member is disposed that assists switching between the drive coupling state and the non-drive coupling state of the first ratchet mechanism and the second ratchet mechanism. Due to a thrust movement of the first coupling member in a direction separating from the first drive output gear, the link member causes the second coupling member to move in a direction approaching the second drive output gear, and, due to a thrust movement of the second coupling member in a direction separating from the second drive output gear, the link member causes the first coupling member to move in a direction approaching the first drive output gear.

DETAILED DESCRIPTION

1. Configuration of Image Forming Apparatus

Figure 1:
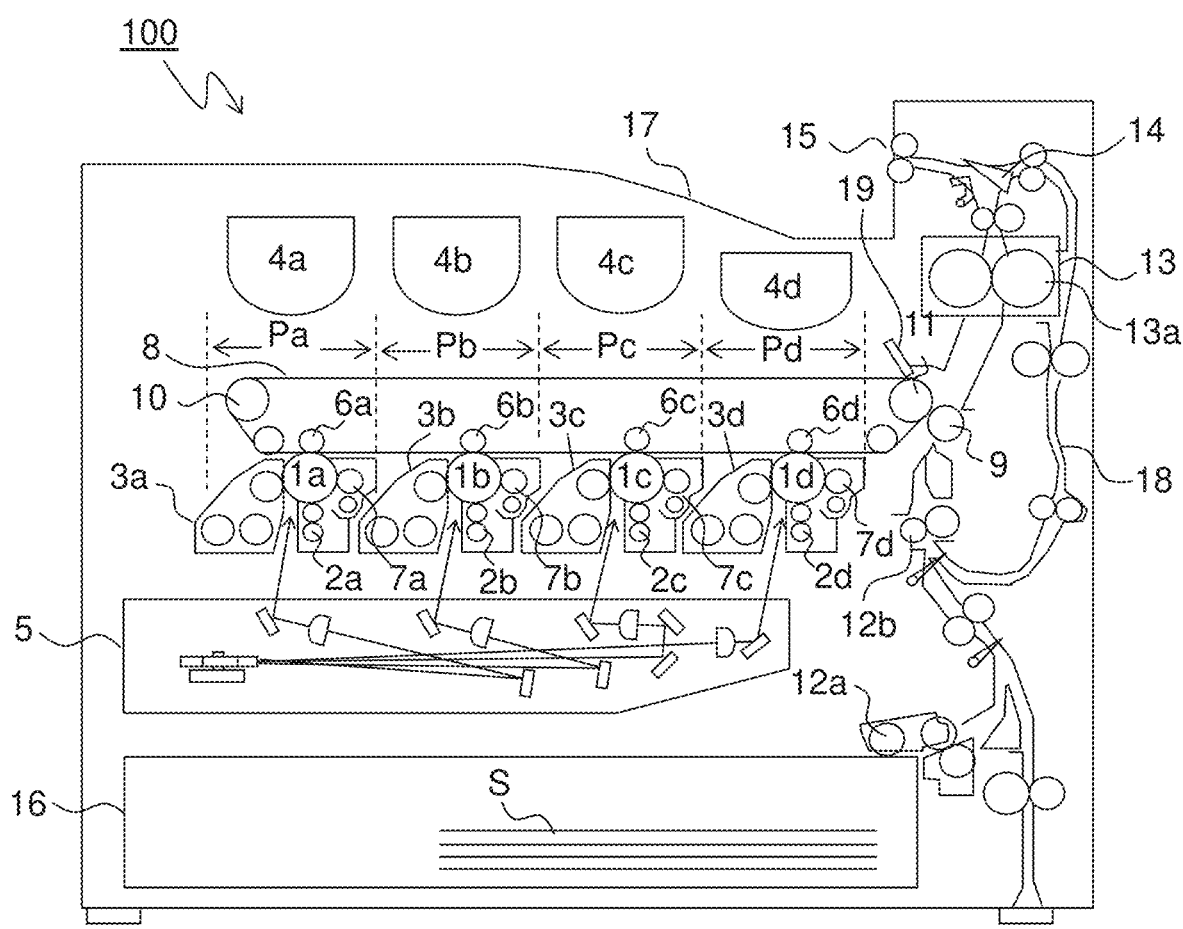
FIG. 1 is a schematic diagram illustrating an internal structure of an image forming apparatus.

Hereinafter, embodiments of the present disclosure will be described with reference to the accompanying drawings. FIG. 1 is a schematic sectional view illustrating an internal structure of an image forming apparatus 100 in which a fixing device 13 according to an embodiment of the present disclosure is mounted. The image forming apparatus 100 (here, a color printer) includes, in a main body thereof, four image forming portions Pa, Pb, Pc, and Pd arranged in this order from an upstream side (a left side in FIG. 1) in a conveyance direction. These image forming portions Pa to Pd are provided corresponding to images of four different colors (cyan, magenta, yellow, and black), and sequentially form images of cyan, magenta, yellow, and black through charging, exposure, developing, and transfer processes.

These image forming portions Pa to Pd are respectively provided with photosensitive drums (image carriers) 1$a$, 1$b$, 1$c$, and 1$d$, which each carry a visible image (a toner image) of a corresponding one of the four different colors, and further, an intermediate transfer belt 8 formed as an endless belt that rotates in a counterclockwise direction in FIG. 1 is provided adjacent to the image forming portions Pa to Pd. Toner images formed on the photosensitive drums 1$a$ to 1$d$ are primarily transferred sequentially onto the intermediate transfer belt 8 which moves while in contact with the photosensitive drums 1$a$ to 1$d$, so that the toner images are superimposed one on another on the intermediate transfer belt 8. Thereafter, the toner images primarily transferred on the intermediate transfer belt 8 are secondarily transferred by a secondary transfer roller 9 onto a sheet S as one example of a recording medium. Further, the sheet S with the secondarily transferred toner images thereon is subjected to fixing of the toner images at the fixing device 13, and is then discharged from the main body of the image forming apparatus 100. While rotating the photosensitive drums 1$a$ to 1$d$ in a clockwise direction in FIG. 1 by means of a main motor (unillustrated), an image forming process is executed with respect to the photosensitive drums 1$a$ to 1$d$.

A sheet S onto which toner images are to be secondarily transferred is stored in a sheet cassette 16 disposed in a lower part of the main body of the image forming apparatus 100, and the sheet S is conveyed, via a sheet feeding roller 12$a$ and a pair of registration rollers 12$b$, to a nip portion formed between the secondary transfer roller 9 and a driving roller 11 for the intermediate transfer belt 8. As the intermediate transfer belt 8, a dielectric resin sheet is used, and a (seamless) belt having no seam is typically used. On a downstream side of the secondary transfer roller 9, a blade-shaped belt cleaner 19 is disposed for removing toner and the like left on a surface of the intermediate transfer belt 8.

Next, the image forming portions Pa to Pd will be described. Around and below the photosensitive drums 1$a$ to 1$d$, which are arranged rotatably, there are provided charging devices 2$a$, 2$b$, 2$c$, and 2$d$ that charge the photosensitive drums 1$a$ to 1$d$, an exposure device 5 that exposes the photosensitive drums 1$a$ to 1$d$ to light that conveys image information, developing devices 3$a$, 3$b$, 3$c$, and 3$d$ that form toner images on the photosensitive drums 1$a$ to 1$d$, and cleaning devices 7$a$, 7$b$, 7$c$, and 7$d$ that remove developer (toner) and the like left on the photosensitive drums 1$a$ to 1$d$.

Upon image data being input from a host device such as a personal computer, first, charging devices 2$a$ to 2$d$ uniformly charge surfaces of the photosensitive drums 1$a$ to 1$d$. Then, the exposure device 5 applies light to the photosensitive drums 1$a$ to 1$d$ corresponding to the image data, thereby forming electrostatic latent images on the photosensitive drums 1$a$ to 1$d$ corresponding to the image data. The developing devices 3$a$ to 3$d$ are each filled with a predetermined amount of two-component developer including a cyan, magenta, yellow, or black toner. Note that, when, as a result of image formation performed as will be described later, the proportion of toner in the two-component developer filled in each of the developing devices 3$a$ to 3$d$ falls below a specified value, toner is supplied to each of the developing devices 3$a$ to 3$d$ from a corresponding one of toner containers 4$a$ to 4$d$. The toner included in the developer is supplied by each of the developing devices 3$a$ to 3$d$ onto a corresponding one of the photosensitive drums 1$a$ to 1$d$ to electrostatically adhere thereto, and thereby a toner image is formed corresponding to the electrostatic latent image having been formed by exposure to the light from the exposure device 5.

Then, by primary transfer rollers 6$a$ to 6$d$, an electric field is applied at a predetermined transfer voltage between the primary transfer rollers 6$a$ to 6$d$ and the photosensitive drums 1$a$ to 1$d$, and toner images of cyan, magenta, yellow, and black on the photosensitive drums 1$a$ to 1$d$ are primarily transferred onto the intermediate transfer belt 8. These images of the four different colors are formed in a predetermined positional relationship with each other determined in advance for formation of a predetermined full-color image. Thereafter, in preparation for subsequently performed formation of new electrostatic latent images, toner and the like left on the surfaces of the photosensitive drums 1$a$ to 1$d$ after the primary transfer are removed by the cleaning devices 7$a$ to 7$d$.

The intermediate transfer belt 8 is wound around and between a driven roller 10 on an upstream side and a driving roller 11 on a downstream side; as the intermediate transfer belt 8 starts to rotate counterclockwise along with rotation of the driving roller 11 due to a belt driving motor (unillustrated), a sheet S is conveyed from the pair of registration rollers 12$b$, with predetermined timing, to a nip portion (a secondary transfer nip portion) formed between the driving roller 11 and the secondary transfer roller 9 provided adjacent to the driving roller 11, and the full-color image on the intermediate transfer belt 8 is secondarily transferred onto the sheet S. The sheet S having the toner images secondarily transferred thereon is conveyed to the fixing device 13.

At the fixing device 13, the sheet S is heated and pressed by a fixing roller 131 and a pressure roller 132 (see FIG. 2), and thereby the toner images are fixed on the surface the sheet S to form the predetermined full-color image. The sheet S having the full-color image formed thereon has its conveyance direction switched via a branch portion 14 branching into a plurality of directions, so that the sheet S is discharged as it is (or after being sent into a duplex-printing conveyance path 18 and then subjected to duplex printing) onto a discharge tray 17 by a pair of discharge rollers 15.

2. Configuration of Fixing Device

Figure 2:
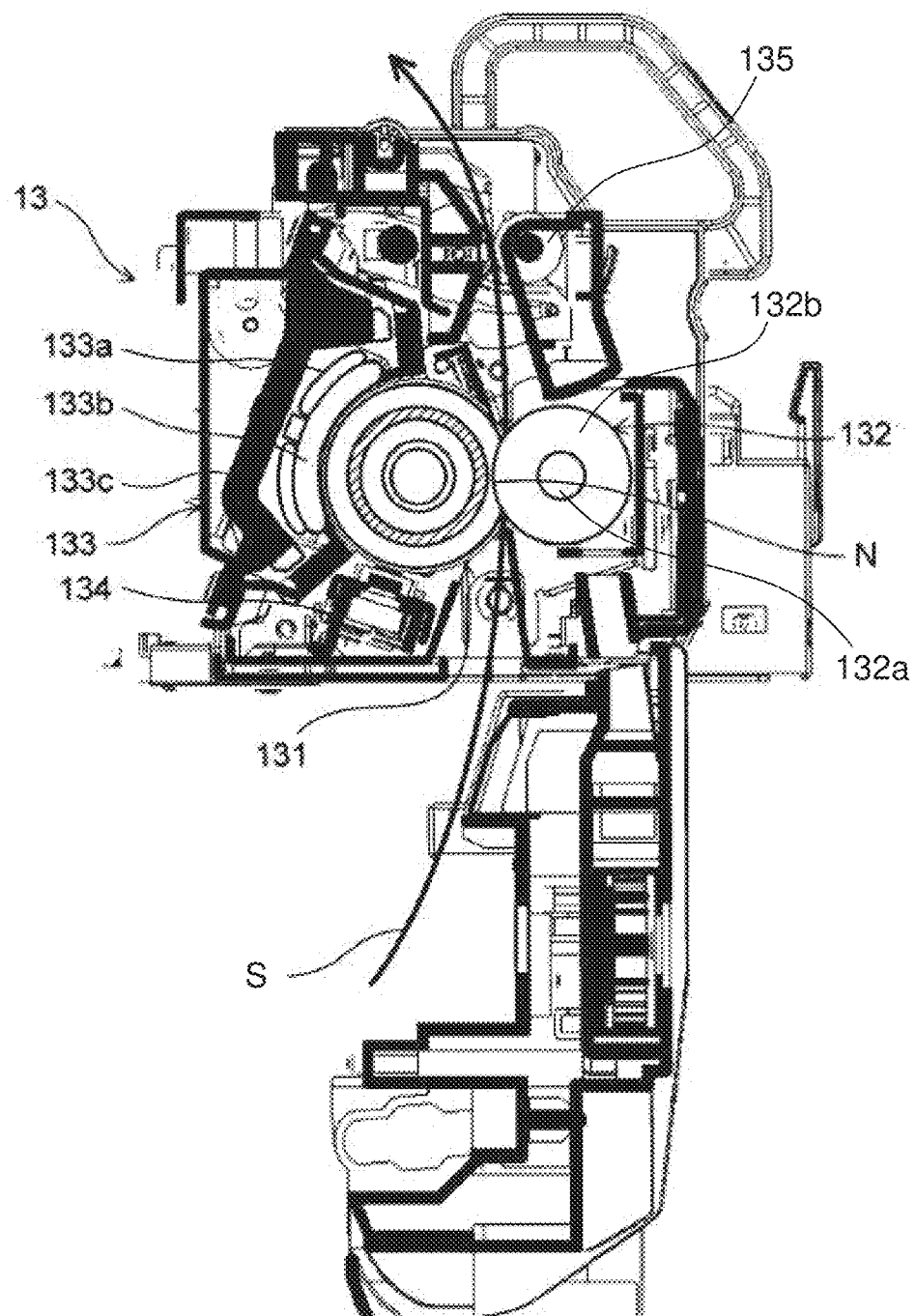
FIG. 2 is a side sectional view of and around a fixing device illustrated in FIG. 1.

FIG. 2 is a side sectional view of and around the fixing device 13 illustrated in FIG. 1. The fixing device 13 employs a fixing method using an electromagnetic induction heating-type heat source, and includes the fixing roller 131 as a heating member, the pressure roller 132 as a pressing rotary body, an induction heating portion 133 arranged so as to face an outer circumference of the fixing roller 131, and a temperature sensor 134 that is constituted of a thermistor or the like to sense temperature of a surface of the fixing roller 131. The induction heating portion 133 and the temperature sensor 134 are fixed to the main body of the image forming apparatus 100, and the fixing roller 131 and the pressure roller 132 are rotatably held on a housing of the fixing device 13.

The fixing roller 131 includes a base member formed as a cylindrical stainless steel member, an elastic layer formed of a silicone rubber sponge for giving elasticity to a fixing nip portion N where the fixing roller 131 is in pressure contact with the pressure roller 132, and a release layer formed of a fluorine-based resin which gives releasability to the elastic layer (of which none is illustrated), and between the base member and the elastic layer, a heat insulating layer and a induction heating layer (of which neither is illustrated) are provided in order from a side of the base member.

The pressure roller 132 includes a shaft 132a formed of aluminum, an elastic layer 132b formed of a silicone rubber on the shaft 132a to give elasticity to the fixing nip portion N, and a release layer (unillustrated) formed of a fluorine resin tube covering a surface of the elastic layer 132b for improved releasability during fixing of an unfixed toner image by fusion at the fixing nip portion N.

Further, the pressure roller 132 is driven to rotate by a fixing drive motor 20 (see FIG. 4), and furthermore, the pressure roller 132 is pressed by a pressure mechanism 21 (see FIG. 3) toward a center of the fixing roller 131 in a radial direction. Thereby, the pressure roller 132 is pressed against the fixing roller 131, and when the pressure roller 132 rotates, the fixing roller 131 also rotates following the pressure roller 132 in the same direction as the pressure roller 132 at the fixing nip portion N.

The temperature sensor 134 includes temperature sensors 134 disposed so as to face a sheet-passing region in a middle part of the fixing roller 131 in an axial direction (a width direction) of the fixing roller 131 and opposite end parts of the fixing roller 131 in the axial direction, the end parts being non-sheet-passing regions when a small-size sheet such as an A4 longitudinal size sheet is passed, and temperature sensors 134 detect temperatures of the respective regions. Based on temperatures detected by the temperature sensors 134, power supply to the induction heating portion 133 is controlled, and thereby the surface of the fixing roller 131 is maintained at a predetermined temperature.

The induction heating portion 133, which includes an excitation coil 133a, a bobbin 133b, and a core 133c, functions to heat the fixing roller 131 by electromagnetic induction, extends in an axial direction of the fixing roller 131, and is arranged to face the fixing roller 131 so as to surround part of the outer circumference of the fixing roller 131.

The excitation coil 133a, which is made of a copper wire, is wound on the bobbin 133b such that the excitation coil 133a is arranged in a spiral shape across a part of the outer circumference of the fixing roller 131 so as to circle around a middle part of the core 133c in an axial direction. The excitation coil 133a is connected to an unillustrated high-voltage power supply, and generates a magnetic flux using a high-frequency current supplied from the power supply. The magnetic flux from the induction heating portion 133 is emitted in a direction parallel to the sheet on which FIG. 2 is drawn, and penetrates through the induction heating layer of the fixing roller 131. An eddy current is generated around the magnetic flux in the induction heat generation layer, and when the eddy current flows, Joule heat is generated due to electrical resistance in the induction heat generation layer, and thereby the induction heat generation layer generates heat.

The power of the high-voltage power supply is controlled based on temperatures detected by the temperature sensors 134 such that the fixing roller 131 is heated to a predetermined temperature by the induction heating portion 133. When the fixing roller 131 is heated to the predetermined temperature, the sheet S nipped at the fixing nip portion N is heated and is also pressed by the pressure roller 132, and thereby the unfixed toner image is fused and fixed.

The sheet S having the toner image fixed thereon is discharged onto the discharge tray 17 from the pair of discharge rollers 15 via a pair of fixing conveyance rollers 135 (see FIG. 1 for all). Linear speed of the pair of fixing conveyance rollers 135 is set slightly higher than that of the fixing roller 131 and the pressure roller 132 to prevent a sheet S from being bent while being conveyed.

Figure 3:
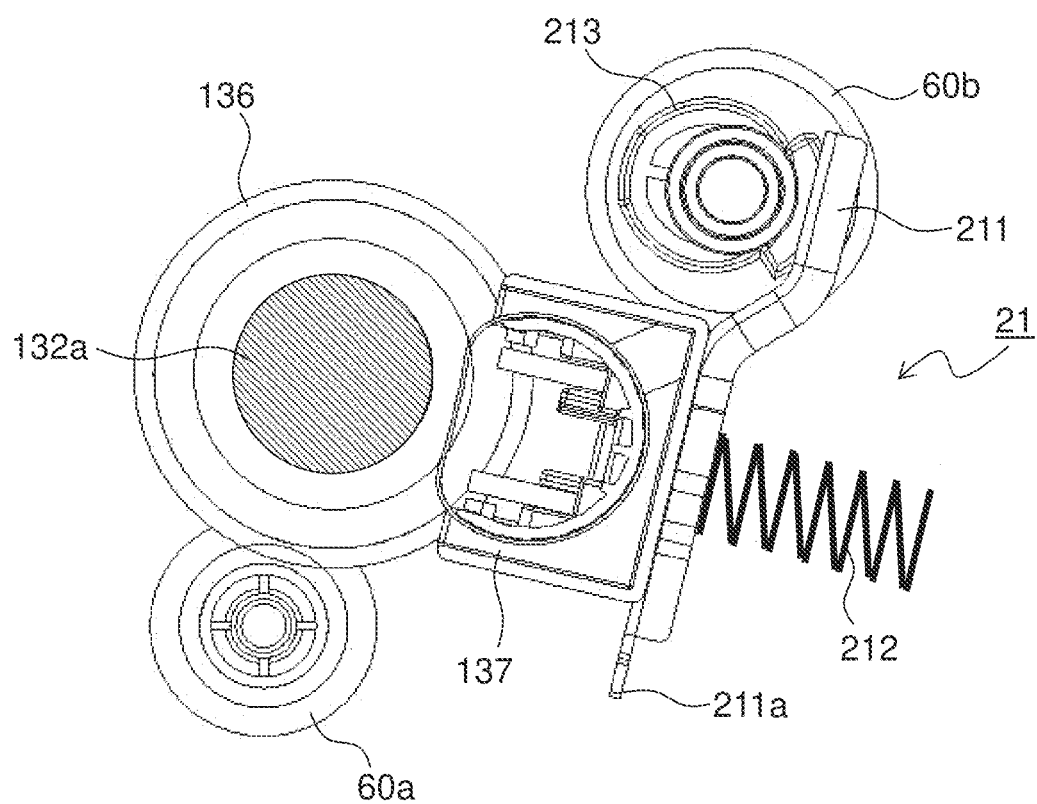
FIG. 3 is a side view illustrating a structure of and around a pressure mechanism of the fixing device.

FIG. 3 is a side view illustrating a configuration of and around the pressure mechanism 21 of the fixing device 13. To the shaft 132a of the pressure roller 132, a fixing drive gear 136 is fixed. To the fixing drive gear 136, a first drive output gear 60a of a drive transmission mechanism 30 (see FIG. 4) is coupled.

The pressure mechanism 21 includes a pressure plate 211, a pressure spring 212, and an eccentric cam 213. The pressure plate 211 is disposed so as to face a bearing portion 137 of the pressure roller 132. The pressure plate 211 has a fulcrum portion 211a thereof fixed to a housing (unillustrated) of the fixing device 13, and is swingable in approaching and separating directions with respect to the bearing portion 137. The pressure spring 212 is disposed opposite the bearing portion 137 across the pressure plate 211, and biases the pressure plate 211 in a direction approaching the bearing portion 137.

The eccentric cam 213 is disposed opposite side the pressure spring 212 across the pressure plate 211. The eccentric cam 213 is integrally formed with a second drive output gear 60b of the drive transmission mechanism 30 (see FIG. 4). When the eccentric cam 213 rotates along with the second drive output gear 60b, the diameter of the eccentric cam 213 abutting against the pressure plate 211 varies.

More specifically, when, as illustrated in FIG. 3, a small-diameter part of the eccentric cam 213 faces the pressure plate 211, due to a biasing force of the pressure spring 212, a predetermined pressure acts from the pressure plate 211 on the bearing portion 137. As the eccentric cam 213 rotates by a predetermined amount from the state illustrated in FIG. 3 so that the outer diameter of the eccentric cam 213 contacting the pressure plate 211 increases, the pressure plate 211 is, against the biasing force of the pressure spring 212, pushed in a direction separating from the bearing portion 137. As a result, the pressure spring 212 is compressed, so that the pressure acting from the pressure plate 211 on the bearing portion 137 is reduced. That is, by means of the rotation amount (rotation angle) of the eccentric cam 213, it is possible to regulate a pressing force of the pressure roller 132 with respect to the fixing roller 131.

3. Configuration of Drive Transmission Mechanism

Figure 4:
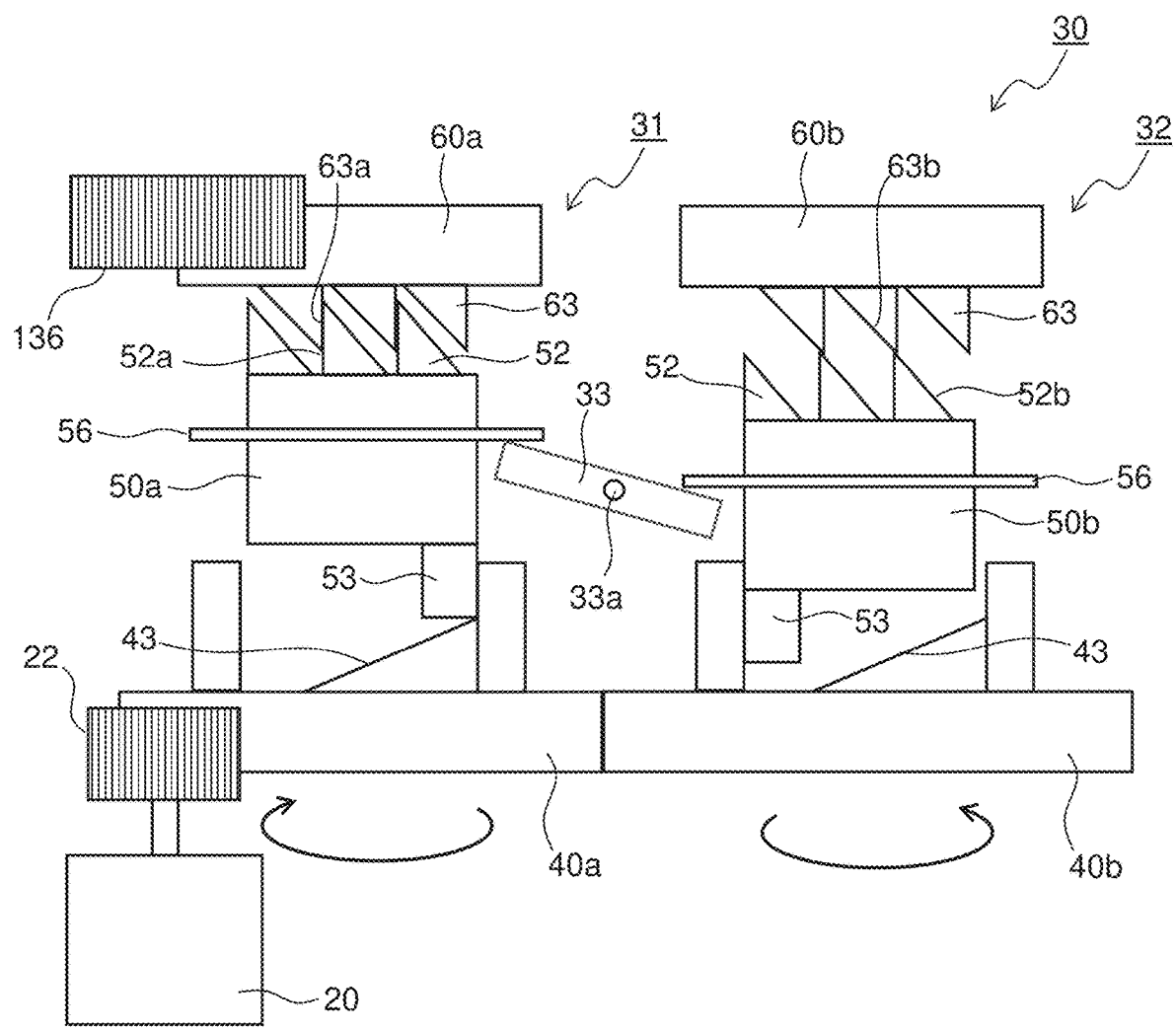
FIG. 4 is a diagram schematically illustrating a drive transmission mechanism that transmits a driving force to the fixing device, illustrating a drive coupling state of a first ratchet mechanism.

FIG. 4 is a diagram schematically illustrating the drive transmission mechanism 30 that transmits a driving force to the fixing device 13. As illustrated in FIG. 4, the drive transmission mechanism 30 includes a first ratchet mechanism 31, a second ratchet mechanism 32, and a link member 33.

The first ratchet mechanism 31 includes a first drive input gear 40a, a first coupling member 50a, and a first drive output gear 60a. The first ratchet mechanism 31 has the first drive input gear 40a thereof coupled to the fixing drive motor 20 and further has the first drive output gear 60a thereof coupled to the fixing drive gear 136, and transmits a rotational driving force via the fixing drive gear 136 to the pressure roller 132.

The second ratchet mechanism 32 includes a second drive input gear 40b, a second coupling member 50b, and a second drive output gear 60b. The second ratchet mechanism 32 has the second drive input gear 40b thereof coupled to the fixing drive motor 20 and further has the second drive output gear 60b thereof coupled to the pressure mechanism 21 via the eccentric cam 213 integrally formed with the second drive output gear 60b (see FIG. 3 for all), and transmits a driving force to the pressure mechanism 21.

The link member 33 is disposed between the first coupling member 50a of the first ratchet mechanism 31 and the second coupling member 50b of the second ratchet mechanism 32. Opposite end parts of the link member 33 swing up and down about a swing pivot shaft 33a provided in a center part of the link member 33 in a longitudinal direction thereof. The link member 33 swings due to thrust movements of the first coupling member 50a and the second coupling member 50b, and thereby assists switching drive-force transmission between the first ratchet mechanism 31 and the second ratchet mechanism 32.

Figure 5:
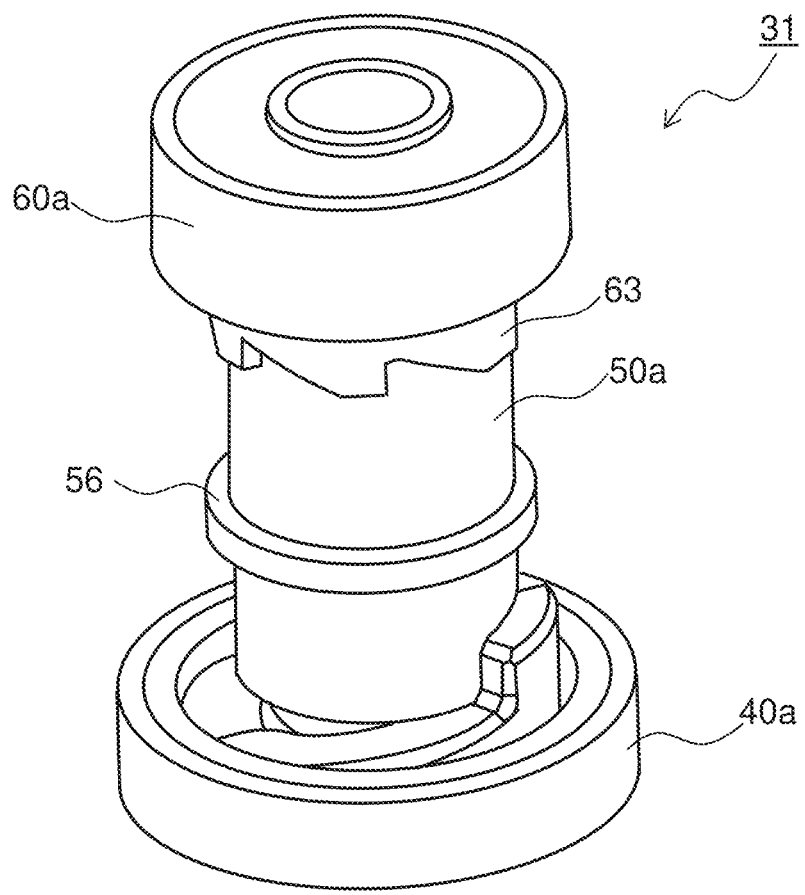
FIG. 5 is a perspective view of the first ratchet mechanism constituting the drive transmission mechanism.
Figure 6:
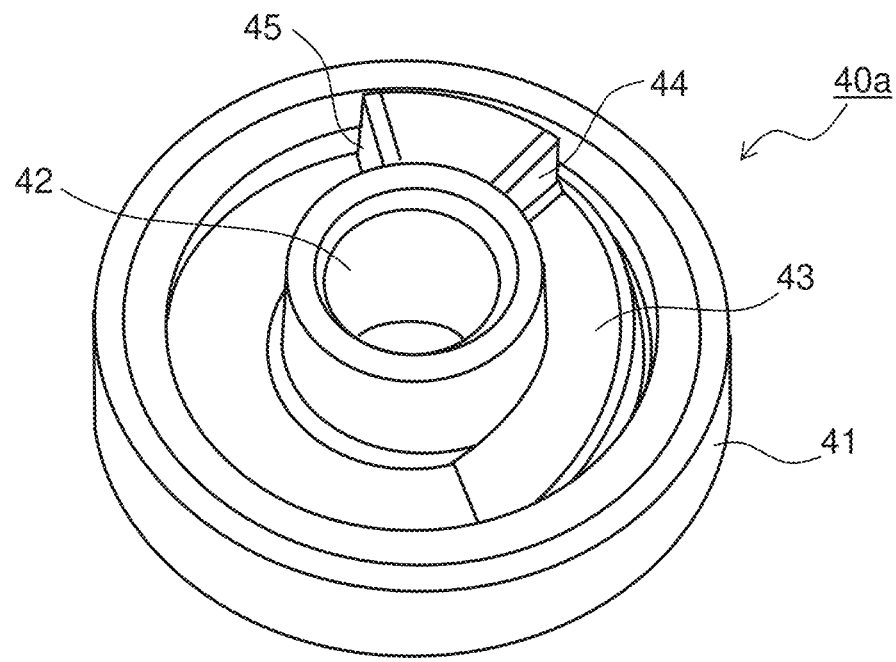
FIG. 6 is a perspective view of a first drive input gear constituting the first ratchet mechanism.
Figure 7:
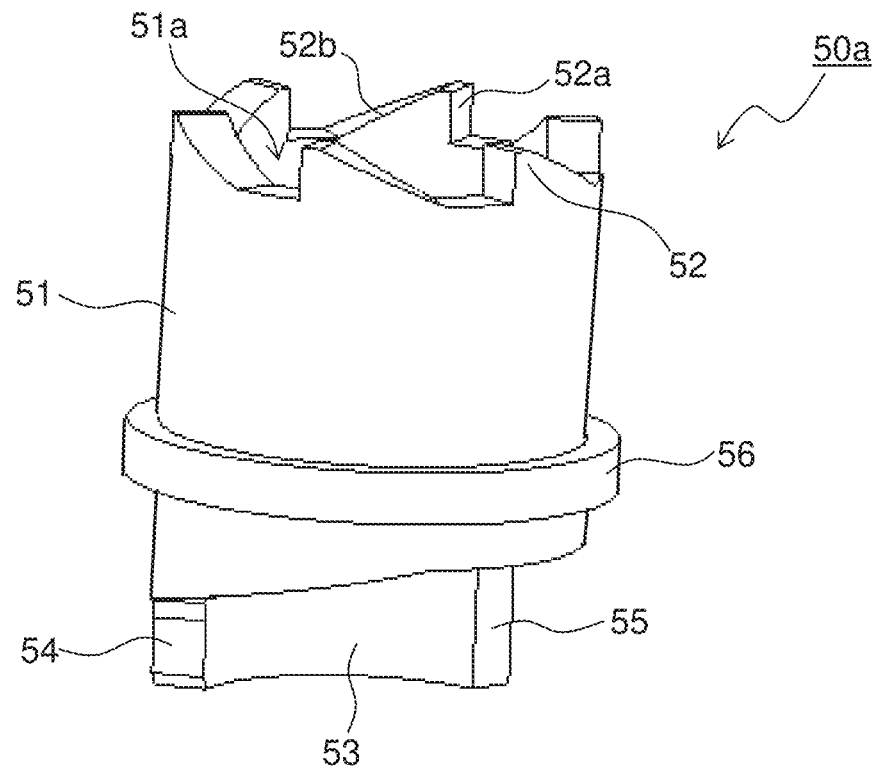
FIG. 7 is a perspective view of a first coupling member constituting the first ratchet mechanism.
Figure 8:
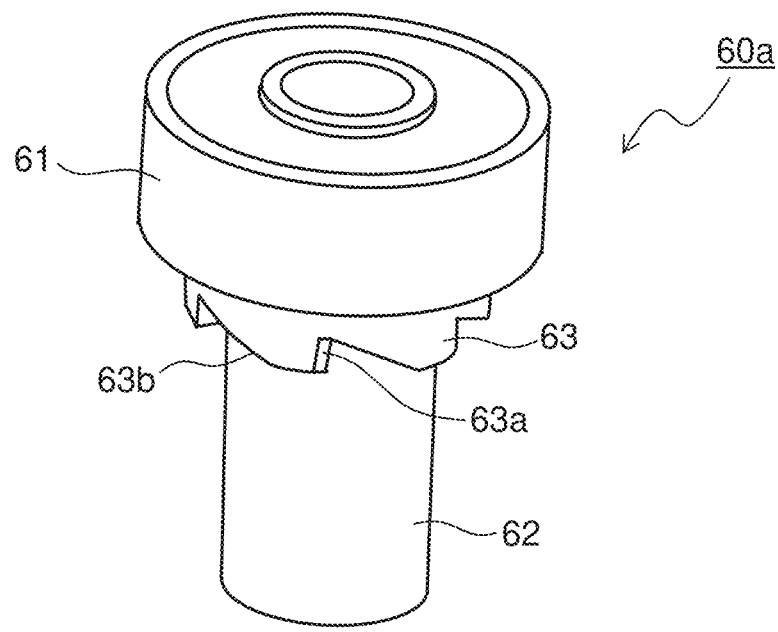
FIG. 8 is a perspective view of a first drive output gear constituting the first ratchet mechanism.

FIG. 5 is a perspective view of the first ratchet mechanism 31 constituting the drive transmission mechanism 30. FIG. 6 to FIG. 8 are respectively perspective views of the first drive input gear 40a, the first coupling member 50a, and the first drive output gear 60a constituting the first ratchet mechanism 31. Referring to FIG. 5 to FIG. 8, a configuration of the first ratchet mechanism 31 will be described. Note that the second drive input gear 40b, the second coupling member 50b, and the second drive output gear 60b (see FIG. 4 for all) of the second ratchet mechanism 32 respectively have configurations completely identical to those illustrated in FIG. 6 to FIG. 8.

As illustrated in FIG. 6, the first drive input gear 40a includes a gear main body 41, a boss portion 42, a slope 43, a first rotation restricting portion 44, and a second rotation restricting portion 45. In an outer circumferential surface of the gear main body 41, gear teeth (unillustrated) are formed. The boss portion 42 is formed on an rotation axis of the gear main body 41, and a shaft portion 62 (see FIG. 8) of the first drive output gear 60a is rotatably inserted into the boss portion 42.

The slope 43 is spirally formed in a surface that faces the first coupling member 50a so as to be between the gear main body 41 and the boss portion 42. The first rotation restricting portion 44 and the second rotation restricting portion 45 are perpendicular surfaces respectively formed at an uppermost part and a lowermost part of the slope 43.

The first drive input gear 40a meshes with a pinion gear 22 (see FIG. 4) that is fixed to an output shaft of the fixing drive motor 20. The first drive input gear 40a also meshes with the second drive input gear 40b (see FIG. 4), which constitutes the second ratchet mechanism 32.

As illustrated in FIG. 7, the first coupling member 50a includes a main body portion 51, a first ratchet tooth 52, a leg portion 53, a first rotation restricting surface 54, a second rotation restricting surface 55, and a flange portion 56. The main body portion 51 has a cylindrical shape with a through hole 51a formed therein.

As the first ratchet tooth 52, a plurality of (six in the present embodiment) first ratchet teeth 52 are formed in an upper end part of the main body portion 51. Each of the first ratchet teeth 52 has a drive coupling surface 52a that is substantially perpendicular, and a non-drive coupling surface 52b that is inclined at a predetermined angle downward from an upper end of the drive coupling surface 52a.

The leg portion 53 is formed at a lower end part of the main body portion 51. The leg portion 53 contacts the slope 43 of the first drive input gear 40a. Along with rotation of the first drive input gear 40a, the leg portion 53 moves in an up-down direction along the slope 43. In this manner, the first coupling member 50a is disposed so as to be capable of performing a thrust movement with respect to the first drive input gear 40a.

The first rotation restricting surface 54 and the second rotation restricting surface 55 are respectively formed at one end side and the other end side of the leg portion 53 in a circumferential direction thereof. The first rotation restricting surface 54 abuts against the first rotation restricting portion 44 of the first drive input gear 40a. The second rotation restricting surface 55 abuts against the second rotation restricting portion 45 of the first drive input gear 40a.

The flange portion 56 is formed in an annular shape on an outer circumferential surface of the main body portion 51. A swing end of the link member 33 (see FIG. 4) abuts against a lower surface of the flange portion 56.

As illustrated in FIG. 8, the first drive output gear 60a includes a gear main body 61, a shaft portion 62, and a second ratchet tooth 63. In an outer circumferential surface of the gear main body 61, gear teeth (unillustrated) are formed that mesh with the fixing drive gear 136 (see FIG. 4). The shaft portion 62 is formed on a rotation axis of the gear main body 61, and is rotatably inserted into the through hole 51a of the first coupling member 50a and the boss portion 42 of the first drive input gear 40a.

As the second ratchet tooth 63, a plurality of (six in the present embodiment) second ratchet teeth 63 are formed in a lower end part of the gear main body 61. The second ratchet teeth 63 mesh with the first ratchet teeth 52 of the first coupling member 50a. Each of the second ratchet teeth 63 has a drive coupling surface 63a that is substantially perpendicular, and a non-drive coupling surface 63b that is inclined at a predetermined angle upward from a lower end of the drive coupling surface 63a.

By the shaft portion 62 of the first drive output gear 60a being inserted into the through hole 51a of the first coupling member 50a and the boss portion 42 of the first drive input gear 40a, the first drive input gear 40a, the first coupling member 50a, and the first drive output gear 60a are disposed on the same axis.

The first drive output gear 60a, due to a thrust movement of the first coupling member 50a, switches between a drive coupling state, in which the drive coupling surfaces 52a of the first ratchet teeth 52 mesh with the non-drive coupling surfaces 63b of the second ratchet teeth 63, and a non-drive coupling state, in which the non-drive coupling surfaces 52b of the first ratchet teeth 52 face the non-drive coupling surfaces 63b of the second ratchet teeth 63.

4. Procedure of Switching Drive Transmission Using Drive Transmission Mechanism

Next, a description will be given of a procedure of switching drive transmission with respect to the fixing device 13 using the drive transmission mechanism 30. To drive the pressure roller 132 of the fixing device 13 to rotate, as illustrated in FIG. 4, the fixing drive motor 20 is rotated forward to rotate the first drive input gear 40a of the first ratchet mechanism 31 in the clockwise direction in FIG. 6 (a direction in which an outer circumferential surface of the first drive input gear 40a moves from right to left in FIG. 4). Along with the rotation of the first drive input gear 40a, the leg portion 53 of the first coupling member 50a starts to ascend the slope 43 of the first drive input gear 40a.

Then, when the leg portion 53 has completely ascended the slope 43, the first rotation restricting surface 54 of the first coupling member 50a contacts the first rotation restricting portion 44 of the first drive input gear 40a, so that a rotational driving force is transmitted from the first drive input gear 40a to the first coupling member 50a. As a result, the first coupling member 50a rotates in the clockwise direction in FIG. 7 (a direction in which an outer circumferential surface of the first coupling member 50a moves from right to left in FIG. 4).

Further, by the first coupling member 50a ascending the slope 43, the first ratchet mechanism 31 is brought into the drive coupling state in which the drive coupling surfaces 52a of the first ratchet teeth 52 mesh with the drive coupling surfaces 63a of the second ratchet teeth 63. Thereby, the first drive output gear 60a is caused to rotate in the clockwise direction in FIG. 7 (a direction in which an outer circumferential surface of the first drive output gear 60a moves from right to left in FIG. 4), and the rotational driving force is transmitted to the fixing drive gear 136.

On the other hand, the second drive input gear 40b of the second ratchet mechanism 32 rotates, along with rotation of the first drive input gear 40a, in the counterclockwise direction in FIG. 6 (a direction in which an outer circumferential surface of the second drive input gear 40b moves from left to right in FIG. 4). Along with the rotation of the second drive input gear 40b, the leg portion 53 of the second coupling member 50b starts to descend the slope 43 of the second drive input gear 40b.

Then, when the leg portion 53 has completely descended the slope 43, the second rotation restricting surface 55 of the second coupling member 50b contacts the second rotation restricting portion 45 of the second drive input gear 40b, so that a rotational driving force is transmitted from the second drive input gear 40b to the second coupling member 50b. As a result, the second coupling member 50b rotates in the counterclockwise direction in FIG. 7 (a direction in which an outer circumferential surface of the second coupling member 50b moves from left to right in FIG. 4).

Further, by the second coupling member 50b descending the slope 43, the second ratchet mechanism 32 is brought into the non-drive coupling state in which the non-drive coupling surfaces 52b of the first ratchet teeth 52 face the non-drive coupling surfaces 63b of the second ratchet teeth 63. Thereby, the rotational driving force is not transmitted from the second coupling member 50b to the second drive output gear 60b, and the rotational driving force is not transmitted to the pressure mechanism 21.

Furthermore, the non-drive coupling surfaces 52b and the non-drive coupling surfaces 63b are each inclined toward a downstream side in a rotation direction. Thus, when the second coupling member 50b rotates with the non-drive coupling surfaces 52b in contact with the non-drive coupling surfaces 63b, due to a perpendicularly downward component force of drag acting between the non-drive coupling surfaces 52b and the non-drive coupling surfaces 63b, the second coupling member 50b moves in a direction (a downward direction) away from the second drive output gear 60b.

Thereby, the flange portion 56 formed in the second coupling member 50b pushes down one end side (on the right side in FIG. 4) of the link member 33. As a result, the other end side (on a left side in FIG. 4) of the link member 33 pushes up the flange portion 56 of the first coupling member 50a.

Figure 9:
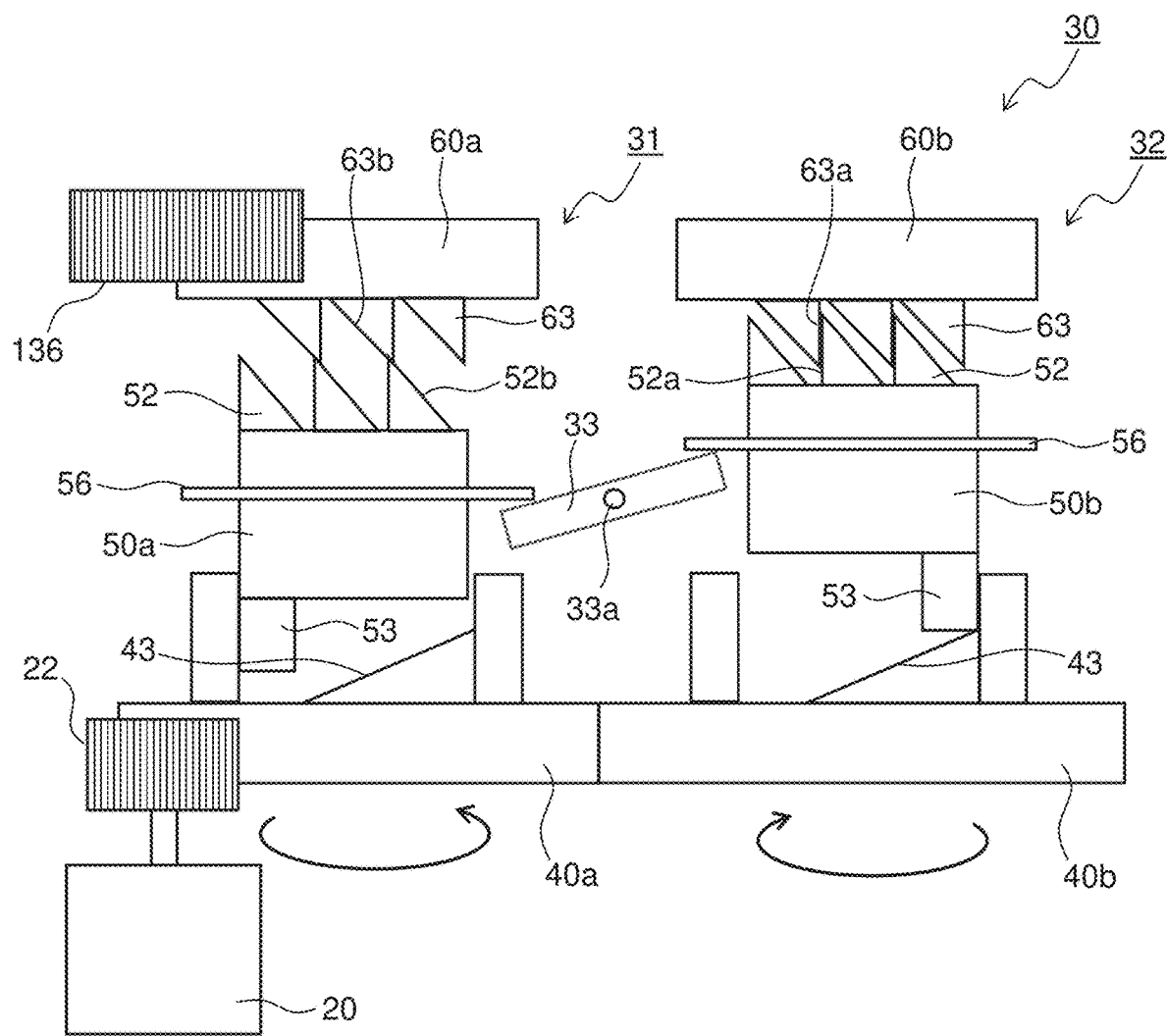
FIG. 9 is a diagram schematically illustrating the drive transmission mechanism that transmits a driving force to the fixing device, illustrating a drive coupling state of a second ratchet mechanism.

Next, a description will be given of a case of driving the pressure mechanism 21 of the pressure roller 132. FIG. 9 is a diagram schematically illustrating the drive transmission mechanism 30 that transmits a driving force to the fixing device 13, illustrating the drive coupling state of the second ratchet mechanism 32. From the state illustrated in FIG. 4, the fixing drive motor 20 is reversely rotated to rotate the first drive input gear 40a of the first ratchet mechanism 31 in the counterclockwise direction in FIG. 6 (a direction in which the outer circumferential surface of the first drive input gear 40a moves from left to right in FIG. 9). Along with the rotation of the first drive input gear 40a, the leg portion 53 of the first coupling member 50a starts to descend the slope 43 of the first drive input gear 40a.

Then, when the leg portion 53 has completely descended the slope 43, the second rotation restricting surface 55 of the first coupling member 50a contacts the second rotation restricting portion 45 of the first drive input gear 40a, so that a rotational driving force is transmitted from the first drive input gear 40a to the first coupling member 50a. As a result, the first coupling member 50a rotates in the counterclockwise direction in FIG. 7 (a direction in which the outer circumferential surface of the first coupling member 50a moves from left to right in FIG. 9).

Further, by the first coupling member 50a descending the slope 43, the first ratchet mechanism 31 is brought into the non-drive coupling state in which the non-drive coupling surfaces 52b of the first ratchet teeth 52 face the non-drive coupling surfaces 63b of the second ratchet teeth 63. Thereby, the rotational driving force is not transmitted from the first coupling member 50a to the first drive output gear 60a, and the driving force is not transmitted to the fixing drive gear 136.

Furthermore, the non-drive coupling surfaces 52b and the non-drive coupling surfaces 63b are each inclined toward a downstream side in a rotation direction. Thus, when the first coupling member 50a rotates with the non-drive coupling surfaces 52b in contact with the non-drive coupling surfaces 63b, due to a perpendicularly downward component force of drag acting between non-drive coupling surfaces 52b and the non-drive coupling surfaces 63b, the first coupling member 50a moves in a direction (a downward direction) away from the first drive output gear 60a.

Thereby, the flange portion 56 formed in the first coupling member 50a pushes down the other end side (on the left side in FIG. 9) of the link member 33. As a result, the one end side (on the right side in FIG. 9) of the link member 33 pushes up the flange portion 56 of the second coupling member 50b.

On the other hand, the second drive input gear 40b of the second ratchet mechanism 32 rotates, along with the rotation of the first drive input gear 40a, in the clockwise direction in FIG. 8 (a direction in which the outer circumferential surface of the second drive input gear 40b moves from right to left in FIG. 9). Along with the rotation of the second drive input gear 40b, the leg portion 53 of the second coupling member 50b starts to ascend the slope 43 of the second drive input gear 40b.

Then, when the leg portion 53 has completely ascended the slope 43, the first rotation restricting surface 54 of the second coupling member 50b contacts the first rotation restricting portion 44 of the second drive input gear 40b, such that a rotational driving force is transmitted from the second drive input gear 40b to the second coupling member 50b. As a result, the second coupling member 50b rotates in the clockwise direction in FIG. 7 (a direction in which the outer circumferential surface of the second coupling member 50b moves from right to left in FIG. 9).

Further, by the second coupling member 50b ascending the slope 43, the second ratchet mechanism 32 is brought into the drive coupling state in which the drive coupling surfaces 52a of the first ratchet teeth 52 mesh with the drive coupling surfaces 63a of the second ratchet teeth 63. Thereby, the second drive output gear 60b is caused to rotate in the clockwise direction in FIG. 8 (a direction in which an outer circumferential surface of the second drive output gear 60b moves from right to left in FIG. 9), and the rotational driving force is transmitted, via the eccentric cam 213 integrally formed with the second drive output gear 60b, to the pressure mechanism 21 of the pressure roller 132.

According to the configuration of the present embodiment, by using the first ratchet mechanism 31 and the second ratchet mechanism 32 to switch the transmission of a driving force to the fixing drive gear 136 and the pressure mechanism 21, and by causing the fixing drive motor 20 to rotate forward or reverse, the drive transmission mechanism 30 can switch the transmission of a driving force with respect to the fixing drive gear 136 and the pressure mechanism 21. Accordingly, it is possible, by using the single fixing drive motor 20, to regulate the rotational drive and the pressing force of the pressure roller 132 with respect to the fixing roller 131, and thus to achieve lower cost and a simpler control path as compared to a configuration provided with another separate motor.

Further, by providing the link member 33 which assists the switching of driving force transmission between the first ratchet mechanism 31 and the second ratchet mechanism 32, it is possible to securely perform thrust movements of the first coupling member 50a and the second coupling member 50b.

Thus, regardless of the position of the link member 33, even in a case where the first coupling member 50a or the second coupling member 50b does not ascend the slope 43 by rotating along with the first drive input gear 40a or the second drive input gear 40b, it is possible to push up the first coupling member 50a or the second coupling member 50b to a position where the first ratchet teeth 52 mesh with the second ratchet teeth 63 to securely bring the first ratchet mechanism 31 and the second ratchet mechanism 32 into the drive coupling state.

Note that, for example, in a case where the pinion gear 22 is disposed between the first drive input gear 40a and the second drive input gear 40b, the first drive input gear 40a and the second drive input gear 40b rotate in the same direction. In that case, the first drive input gear 40a and the first coupling member 50a constituting the first ratchet mechanism 31, and the second drive input gear 40b and the second coupling member 50b constituting the second ratchet mechanism 32 need to be opposite to each other in phase.

Thus, in the present embodiment, for the first drive input gear 40a and the second drive input gear 40b to rotate in directions opposite to each other, the first drive input gear 40a of the first ratchet mechanism 31 and the second drive input gear 40b of the second ratchet mechanism 32 are coupled, and the pinion gear 22 of the fixing drive motor 20 is coupled to the first drive input gear 40a of the fixing drive motor 20. In this manner, it is possible to commonize the first drive input gear 40a and the first coupling member 50a constituting the first ratchet mechanism 31 and the second drive input gear 40b and the second coupling member 50b constituting the second ratchet mechanism 32, and thus to reduce the number of components.

It should be understood that the embodiment described above is in no way meant to limit the present disclosure, which thus allows for many modifications and variations within the spirit of the present disclosure. For example, in the above embodiment, the eccentric cam 213 is integrally formed with the second drive output gear 60b, but instead, the second drive output gear 60b may be fixed to the rotation shaft of the eccentric cam 213. Or, gear teeth may be formed on an outer circumferential surface of the eccentric cam 213 so as to mesh with the second drive output gear 60b directly or via an idle gear.

The descriptions have been given above based on a case where the drive transmission mechanism 30 is used to perform switching of the transmission of a driving force between the fixing drive gear 136 and the pressure mechanism 21 of the fixing device 13, but the present disclosure is not limited to the fixing device 13. For example, it is also possible to use the drive transmission mechanism 30 to switch toner supply operation between two development units and two toner containers.

The present disclosure is usable in drive transmission mechanisms that transmit a driving force to a driven member. By using the present disclosure, it is possible to provide a drive transmission mechanism capable of maintaining a ratchet drive portion and a driven member in a coupled state without using a brake by means of a biasing member such as a spring or the like, and a fixing device provided with such a drive transmission mechanism.

What is claimed is:

1. A drive transmission mechanism, comprising:
   a first ratchet mechanism that transmits a rotational driving force from a drive source to a first driven member; and
   a second ratchet mechanism that transmits a rotational driving force from the drive source to a second driven member,
   wherein
   the first ratchet mechanism includes
      a first drive input gear to which a rotational driving force of the drive source is inputted,
      a first drive output gear that is disposed on a same axis as the first drive input gear, and that outputs a rotational driving force of the drive source to the first driven member, and
      a first coupling member that is disposed between the first drive input gear and the first drive output gear so as to be capable of performing a thrust movement, and that rotates along with the first drive input gear,
   the second ratchet mechanism includes
      a second drive input gear to which a rotational driving force of the drive source in inputted,
      a second drive output gear that is disposed on a same axis as the second drive input gear, and that outputs a rotational driving force of the drive source to the second driven member, and
      a second coupling member that is disposed between the second drive input gear and the second drive output gear so as to be capable of performing a thrust movement, and that rotates along with the second drive input gear,
   each of the first coupling member and the second coupling member has a first ratchet tooth that is formed on a surface thereof that faces the first drive output gear or the second drive output gear,
   each of the first drive output gear and the second drive output gear has a second ratchet tooth that is formed on a surface thereof that faces the first coupling member or the second coupling member, and that meshes with the first ratchet tooth,
   when the drive source rotates in a forward direction,
      the first ratchet mechanism rotates in a direction in which drive coupling surfaces of the first ratchet tooth and the second ratchet tooth mesh with each other, and thereby the first ratchet mechanism enters a drive coupling state for transmitting a driving force to the first driven member, and
      the second ratchet mechanism rotates in a direction in which non-drive coupling surfaces of the first ratchet tooth and the second ratchet tooth mesh with each other, and thereby the second ratchet mechanism enters a non-drive coupling state for transmitting no driving force to the second driven member, when the drive source rotates in a reverse direction,
the first ratchet mechanism rotates in a direction in which the non-drive coupling surfaces mesh with each other, and thereby the first ratchet mechanism enters a non-drive coupling state for transmitting no driving force to the first driven member, and the second ratchet mechanism rotates in a direction in which the drive coupling surfaces mesh with each other, and thereby the second ratchet mechanism enters a drive coupling state for transmitting a driving force to the second driven member, between the first ratchet mechanism and the second ratchet mechanism, a link member is disposed that assists switching between the drive coupling state and the non-drive coupling state of the first ratchet mechanism and the second ratchet mechanism, and due to a thrust movement of the first coupling member in a direction separating from the first drive output gear, the link member causes the second coupling member to move in a direction approaching the second drive output gear, and, due to a thrust movement of the second coupling member in a direction separating from the second drive output gear, the link member causes the first coupling member to move in a direction approaching the first drive output gear.

2. The drive transmission mechanism according to claim 1,
wherein
each of the first coupling member and the second coupling member has a flange portion annularly protruding from an outer circumferential surface thereof, the link member has opposite end parts in a longitudinal direction thereof each facing a surface of the flange portion on the side of the first drive output gear and the second drive output gear, and is supported so as to be swingable in the axial direction with a center part thereof in the longitudinal direction thereof as a swing pivot, when the first coupling member performs a thrust movement in a direction separating from the first drive output gear, the flange portion of the first coupling member pushes one end part of the link member toward the first drive input gear, and thereby the second coupling member is pushed in a direction approaching the second drive output gear, and when the second coupling member performs a thrust movement in a direction separating from the second drive output gear, the flange portion of the second coupling member pushes an other end part of the link member toward the second drive input gear, and thereby the first coupling member is pushed in a direction approaching the first drive output gear.

3. The drive transmission mechanism according to claim 1,
wherein
each of the first coupling member and the second coupling member performs a thrust movement in a direction separating from the first drive output gear or the second drive output gear due to a component force of drag acting on the non-drive coupling surfaces of the first ratchet tooth and the second ratchet tooth, the component force acting in a perpendicularly downward direction.

4. The drive transmission mechanism according to claim 1,
wherein
each of the firs drive input gear and the second drive input gear has a slope on a surface thereof facing the first coupling member or the second coupling member, the slope extending along a circumferential direction and inclined in an up-down direction, each of the first coupling member and the second coupling member has, at a lower end part thereof, a leg portion that faces the slope, and each of the first coupling member and the second coupling member moves in a thrust direction by rotating, with the leg portion thereof abutting against the slope, with respect to the first drive input gear or the second drive input gear.

5. The drive transmission mechanism according to claim 4,
wherein
a first rotation restricting portion and a second rotation restricting portion, each being a perpendicular surface, are respectively formed at an uppermost part and a lowermost part of the slope, in the leg portion, a first rotation restricting surface that faces the first rotation restricting portion and a second rotation restricting surface that faces the second rotation restricting portion are formed, with the first rotation restricting portion in contact with the first rotation restricting surface and the first coupling member and the second coupling member rotating along with the first drive input gear or the second drive input gear, the drive coupling surfaces of the first ratchet tooth and the second ratchet tooth mesh with each other, and with the second rotation restricting portion in contact with the second rotation restricting surface and the first coupling member and the second coupling member rotating along with the first drive input gear or the second drive input gear, the non-drive coupling surfaces of the first ratchet tooth and the second ratchet tooth mesh with each other.

6. The drive transmission mechanism according to claim 1,
wherein
the first drive input gear and the second drive input gear are in mesh with each other, and a rotational driving force of the drive source is directly inputted to the first drive input gear, and a rotational driving force of the drive source is inputted to the second drive input gear via the first drive input gear.

7. A fixing device, comprising:
a heated rotary body;
a pressure member that is pressed against the heated rotary body with a predetermined pressure to form a fixing nip portion, and that rotates while transmitting a rotational driving force to the heated rotary body;
a heating mechanism that heats the heated rotary body;
a pressure mechanism that regulates a pressing force of the pressure member with respect to the heated rotary body;
a fixing drive gear as the first driven member that inputs a rotational driving force to the pressure member;
an eccentric cam as the second driven member that drives the pressure mechanism; and
the drive transmission mechanism according to claim 1 that switches between transmission of a rotational driving force to the fixing drive gear and transmission of a rotational driving force to the eccentric cam.

8. An image forming apparatus, comprising:

an image forming portion that forms a toner image on a recording medium; and the fixing device according to claim 7 that heats and presses the recording medium on which the toner image has been formed by the image forming portion, thereby fixing the toner image on the recording medium.

* * * * *